UNITED STATES PATENT OFFICE.

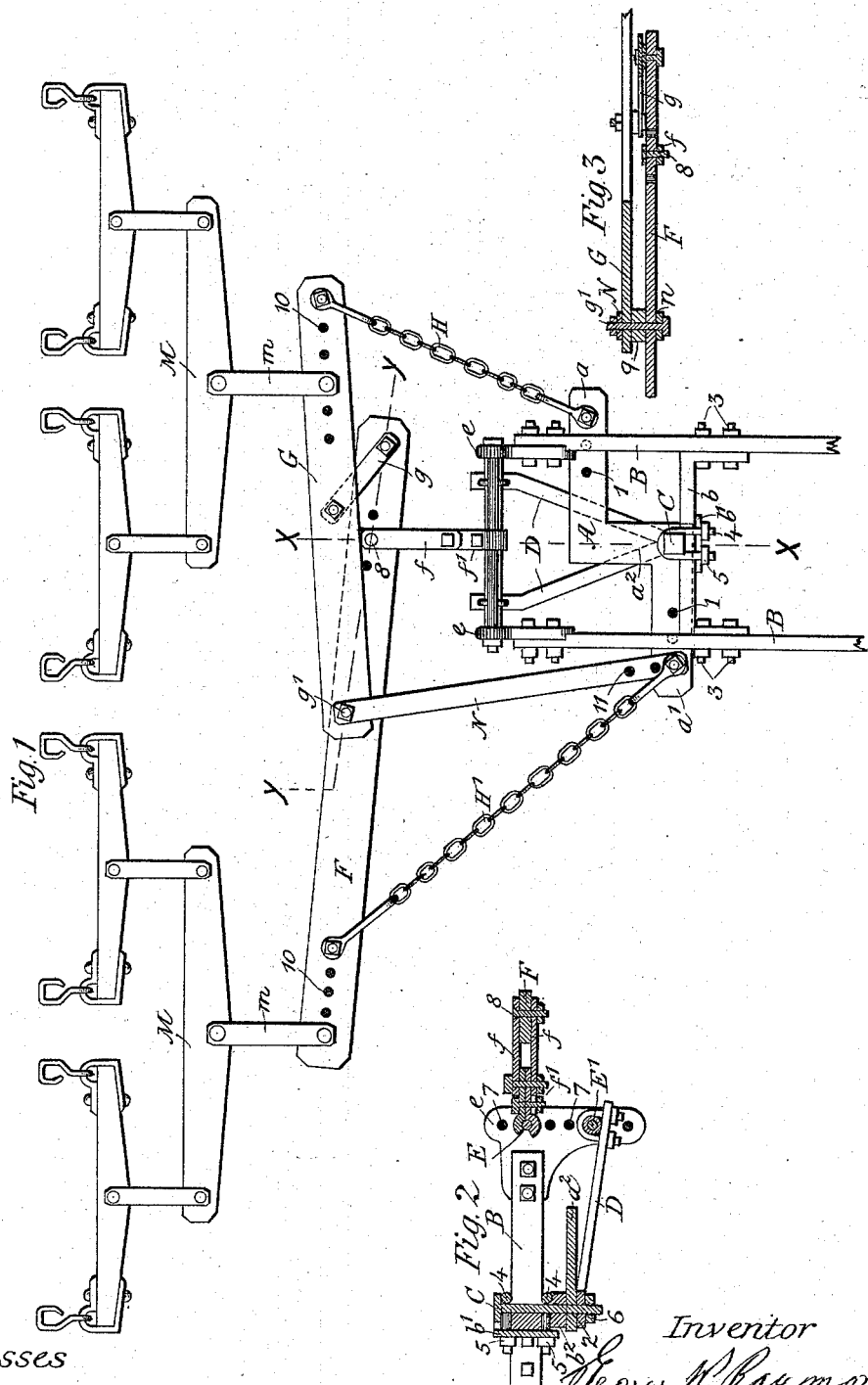

GEORGE W. RAYMOND, OF SENECA, ILLINOIS.

DRAFT-EQUALIZER.

SPECIFICATION forming part of Letters Patent No. 528,111, dated October 23, 1894.

Application filed July 6, 1894. Serial No. 516,704. (No model.)

*To all whom it may concern:*

Be it known that I, GEORGE W. RAYMOND, a citizen of the United States, residing at Seneca, in the county of La Salle and State of Illinois, have invented a new and useful Draft-Equalizer, of which the following is a specification.

My invention relates to a draft-equalizer for use on plows, cultivators, or other like implements, in which it is desired that the plow or cultivator shall be drawn true.

The invention will first be described in connection with the accompanying drawings, and then pointed out in the claims.

Figure 1 of the drawings is a plan view of my improved draft-equalizer, showing it attached to the beams of a gang-plow. Fig. 2 is a sectional view taken on the line $x\,x$, Fig. 1. Fig. 3 is a sectional view taken on the line $y\,y$, Fig. 1.

Referring to the drawings, A is a right-angular draft-plate, the arms $a$ and $a'$ of which are each at a right angle to the central portion $a^2$, a series of holes 1 being formed in each arm for a purpose hereinafter mentioned. At the junction of arm $a'$ with the central portion $a^2$ is a hole 2, through which the draft-pin C is adapted to pass when placed in position.

C represents the draft-pin, which is headed at its upper end and screw-threaded at its lower end, it being secured to the plow-beams B B in the following manner: A brace $b$ is secured to the beams by bolts and nuts 3, and the draft-pin is secured to the front of this brace by two U-shaped bolts 4 passing around the pin, one above and the other below the brace. The ends of the bolts are passed through a plate $b'$, which bears against the rear side of brace $b$, and securely fastened by nuts 5.

On the draft-pin, below the lower bolt 4, is a washer $b^2$, beneath which is placed the draft-plate A; and beneath the draft-plate there is pivotally secured on the pin the rear end of a V-shaped brace D, all the above parts being held in place on the pin by a nut 6 on the lower screw-threaded end.

To the forward end of each plow-beam is securely attached a beam-plate $e$, preferably shaped as shown in Fig. 2, which has a series of holes 7 near the outer edge. Removably secured in the holes 7 are rods E and E', to the lower one E' of which is attached the diverging ends of the before-mentioned V-shaped brace, which is thereby enabled to steady pin C and prevent the pull thereon from drawing it from its vertical position. To the upper rod E there is attached, by means of a flexible connection $f'$, a coupling-strap $f$, between the outer ends of which is pivotally secured at 8 an equalizer F.

A lever G is pivotally secured to the equalizer by means of a bolt $g'$, this lever and equalizer being further joined by means of a connecting-link $g$, which is pivotally secured at one end to the inner end of the equalizer and pivotally secured at the other end to the center of the lever. A washer 9, placed on bolt $g'$ between the equalizer and lever, serves to prevent the latter coming into contact with the ends of the coupling-link $f$ when in operation. A series of holes 10, longitudinally arranged near the outer ends of both lever and equalizer, serve, in conjunction with holes 1 in the draft-plate, to permit chains H and H' to adjustably connect the ends of the lever and equalizer with arms $a$ and $a'$, respectively, of the draft-plate.

N represents what I term the equalizer-strap, it being connected at one end to arm $a'$ of the draft-plate and at the other end to bolt $g'$. A hammer-strap (one end of which is shown at $n$, Fig. 3) secured to the under side of equalizer-strap N serves to permit the latter to be connected to bolt $g'$ both above and below the lever and equalizer, respectively. Near the lower end of strap N is a series of holes 11, whereby the connection of the equalizer-strap with the draft-plate is rendered adjustable.

Ordinary double-trees M are connected to the outer ends of the lever and equalizer by means of links $m$ and bolts passed through one of the holes 10.

It is evident that the first team, or the team drawing on chain H, must in ordinary cases be at a disadvantage, owing to the fact that one of the horses of that team is working directly in front of the implement being drawn, this being especially so in plowing. It is also evident that some means must be provided whereby the pull exerted by the first team will have a greater effect than a similar pull exerted by the second team. This I accomplish by my improved form of draft-plate, from the construction of which it will be readily seen that the power primarily exerted by the first and second teams, respectively, will have a more nearly equal effect on the plow.

The operation of my improved draft-equalizer is as follows: Should the excess of draft be in favor of the first team—that is, on chain H—the arm $a$ of plate A will be moved forward and arm $a'$ backward. This backward movement of arm $a'$ will cause the outer end of the equalizer, through chain H', to move backward; but the lever in moving forward will carry the equalizer, through its pivotal connection therewith at $g'$, with it, this movement in a rearward direction tending to allow the arm $a$ to move backward to regain its normal position and thus draw the plow true.

Having thus described my invention, what I claim as new, and desire to secure by Letters Patent, is—

1. In a draft-equalizer, the combination, with a plow-beam, of a draft-plate pivotally secured thereto, a lever, an equalizer pivotally connected to the lever, an equalizer-strap connected at one end to the point of pivotal connection of the lever and equalizer and at the other end to the draft-plate, chains connecting the ends of the lever and equalizer with the draft-plate, means for attaching the equalizer to the end of the plow-beam, and doubletrees adjustably attached to the lever and equalizer, respectively, substantially as described.

2. In a draft-equalizer, the combination, with a plow-beam, of a right-angular draft-plate pivotally secured thereto, a lever, an equalizer pivotally connected to one end of the lever, an equalizer-strap connected at one end to the point of pivotal connection of the lever and equalizer and at the other end to the draft-plate, chains adjustably connecting the ends of the lever and equalizer with the draft-plate, means for attaching the equalizer to the end of the plow-beam, and doubletrees adjustably attached to the lever and equalizer, respectively, substantially as described.

3. In a draft-equalizer, the combination, with a plow-beam, of a draft-plate comprising two arms and a central portion, one of said arms being in advance of the other, pivotally secured thereto, a lever, an equalizer pivotally secured to one end of the lever, an equalizer-strap connected at one end to the point of pivotal connection of the lever and equalizer and at the other end to the draft-plate, a connecting-link pivotally secured at one end to one end of the equalizer and at the other end to the center of the lever, chains adjustably connecting the ends of the lever and equalizer with the respective arms of the draft-plate, means for attaching the equalizer to the end of the plow-beam, and doubletrees adjustably attached to the lever and equalizer, respectively, substantially as described.

In testimony that I claim the foregoing as my own I have hereto affixed my signature in presence of two witnesses.

GEORGE W. RAYMOND.

Witnesses:
 R. L. WILEY,
 GEO. GARDEN.